United States Patent
Duva et al.

[11] Patent Number: 5,825,608
[45] Date of Patent: Oct. 20, 1998

[54] FEED-THROUGH FILTER CAPACITOR ASSEMBLY

[75] Inventors: Frank A. Duva, Carlsbad; Mansoor Azodi-Kazerooni, Canyon Country, both of Calif.

[73] Assignee: Novacap, Inc., Valencia, Calif.

[21] Appl. No.: 734,027

[22] Filed: Oct. 18, 1996

[51] Int. Cl.$^6$ .............................. H01G 4/35; H01B 17/28
[52] U.S. Cl. ...................... 361/302; 361/303; 361/306.1; 361/301.3; 361/307; 174/143
[58] Field of Search .......................... 174/143, 152 GM, 174/50.58, 50.61; 333/182–183; 361/302–303, 305, 306.1, 307, 301.3

[56] References Cited

U.S. PATENT DOCUMENTS

| | | |
|---|---|---|
| 2,756,375 | 7/1956 | Peck . |
| 3,235,939 | 2/1966 | Rodriguez et al. . |
| 3,546,638 | 12/1970 | Park . |
| 3,920,888 | 11/1975 | Barr . |
| 4,083,022 | 4/1978 | Nijman . |
| 4,148,003 | 4/1979 | Colburn et al. . |
| 4,152,540 | 5/1979 | Duncan et al. . |
| 4,220,813 | 9/1980 | Kyle . |
| 4,247,881 | 1/1981 | Coleman . |
| 4,314,213 | 2/1982 | Wakino . |
| 4,352,951 | 10/1982 | Kyle . |
| 4,362,792 | 12/1982 | Bowsky et al. . |
| 4,421,947 | 12/1983 | Kyle . |
| 4,424,551 | 1/1984 | Stevenson et al. . |
| 4,456,786 | 6/1984 | Kyle . |
| 4,737,601 | 4/1988 | Gartzke . |
| 4,741,710 | 5/1988 | Hogan et al. . |
| 5,032,692 | 7/1991 | DeVolder . |
| 5,070,605 | 12/1991 | Daglow et al. . |
| 5,333,095 | 7/1994 | Stevenson et al. . |
| 5,406,444 | 4/1995 | Selfried et al. .......................... 361/302 |

Primary Examiner—Bot L. Ledynh
Attorney, Agent, or Firm—Banner & Witcoff, Ltd.

[57] ABSTRACT

A feed-through filter capacitor assembly is provided to pass a conductor into a housing of an electronic device while maintaining a hermetic seal and filtering spurious radio frequency signals. The assembly is particularly suitable for use in medical implant devices such as pacemakers. The feed-through filter capacitor assembly comprises a conductive bushing forming a cup that receives a filter capacitor body. The cup is located to one side of a pass-through portion including a passageway in which an insulative spacer is mounted. A plurality of wires pass through the filter capacitor body and spacer. The wires are contacted with inner plates of the capacitor and insulated from the bushing. Conductive polymer resin within the cup provides electrical continuity between outer contacts of the capacitor body and the conductive bushing. This arrangement also provides an effective heat sink for the filter capacitor body and protects the filter capacitor body from physical damage. The arrangement of a cup to the side of the pass-through portion allows sizing of the capacitor independently of the size of a housing hole provided to receive the assembly.

8 Claims, 3 Drawing Sheets

FEED-THROUGH FILTER CAPACITOR ASSEMBLY

BACKGROUND OF THE INVENTION

The present invention relates to conductor feed-through components with a filter capacitor. In particular, the invention relates to feed-through filter capacitor assemblies particularly suited for use in medical implant devices such as pacemakers.

For certain electronic devices, it is necessary to pass a wire into the housing of the device while maintaining a hermetic seal. For example, pacemakers designed for implantation in the human body require an opening in the housing of the device in order to pass conductive wires to the internal electronic components. Because there is an absolute need to prevent body fluids from entering into the interior of the device, the pass-through opening in the housing must be sealed in a gas-tight and liquid-tight manner. Conductor feed-through assemblies designed for this purpose are known in the art, as exemplified by U.S. Pat. Nos. 4,362,792 (Bowsky et al.) and 3,920,888 (Barr).

It has further been observed that wires extending from an electronic device can effectively act as an antenna. As a result, spurious radio frequency signals may be transmitted through the electrical wires and interfere with proper operation of the device, e.g., pacemaker. Accordingly, the application of a filtering capacitor in a conductor feed-through assembly is often desirable.

A known type of feed-through filter capacitor assembly for medical implant devices and the like comprises a conductive canister or ferrule through which a wire passes. A small discoidal capacitor body is fitted in an annular space formed between an inner wall of the canister and the wire. A first set of plates is placed in contact with the wire and a second set of plates is contacted with the canister. See, e.g., U.S. Pat. Nos. 4,456,786 (Kyle); 4,424,551 (Stevenson et al.); and 4,152,540 (Duncan et al.). These known types of feed-through filter capacitor assemblies can be difficult to manufacture. Because the canister provides only a diminutive annular space for receipt of the capacitor, placing a filtering capacitor within the canister generally requires intricate hand work or robotic assembly. Additionally, since the capacitor is typically mounted inside of a part of the canister which is fitted in the housing opening provided to receive the assembly, if it is desired to increase the size of the capacitor, it is also necessary to increase the size of the hole in the housing. This can make it more difficult to obtain and retain a hermetic seal of the housing. Furthermore, a tight fit of a capacitor into a small annular space exposes the capacitor to potentially damaging mechanical stresses caused by disparate thermal coefficients of expansion of the capacitor and the surrounding metal canister material.

Another type of a feed-through filter capacitor assembly known in the art comprises a capacitor body mounted completely outside of the canister or ferrule. See U.S. Pat. No. 5,333,095 (Stevenson et al.). Such a configuration may simplify the manufacturing process and alleviate concerns with disparate thermal coefficients of expansion. However, since the capacitor body is exposed, it is more susceptible to damage. Furthermore, since there is no structure surrounding the canister capable of acting as a heat sink, the capacitor may become overheated.

SUMMARY OF THE INVENTION

In view of foregoing, it is a general object of the present invention to provide an improved feed-through filter capacitor assembly.

More specifically, it is a principal object of the invention to provide a feed-through filter capacitor assembly that is easily manufactured.

Another object of the invention is to provide a feed-through capacitor assembly that allows sizing of the capacitor independently of the size of the housing hole provided to receive the assembly.

Still another object of the invention is to provide a feed-through filter capacitor assembly providing a heat sink to dissipate heat generated in the capacitor body.

Yet another object of the invention is to provide a feed-through filter capacitor assembly that provides protection of the capacitor body from physical damage, while avoiding potentially damaging mechanical stresses caused by disparate thermal coefficients of expansion of the capacitor and surrounding metal material.

These and other objects are achieved in accordance with the present invention by a feed-through filter capacitor assembly which comprises a conductive bushing which has a first end surface and a perimetric wall surrounding the surface to define a cup. The bushing has a pass-through portion adjacent the cup with the pass-through portion having an internal surface defining a passageway extending from the first end surface, within the cup, to a second end surface of the bushing opposite the first end surface. The bushing is mountable to seal a feed-through hole of a conductive housing member such that the pass-through portion extends through the hole and the cup remains to one side. A filter capacitor body is mounted within the cup on the first end surface to extend over the passageway. The capacitor has first and second sets of spaced capacitor plates, one of which is provided in electrical contact with the conductive bushing. At least one conductor extends through the filter capacitor body and the passageway, and the conductor is provided in electrical contact with the second set of capacitor plates. An electrically insulative spacer which serves to insulate the at least one conductor from the conductive bushing is mounted in the passageway.

These and other objects, features and advantages of the present invention will become apparent and fully understood from the following detailed description of the preferred embodiments, taken in connection with the appended drawings.

DETAILED DESCRIPTION OF THE PREFERRED EMBODIMENTS

Figure 1:
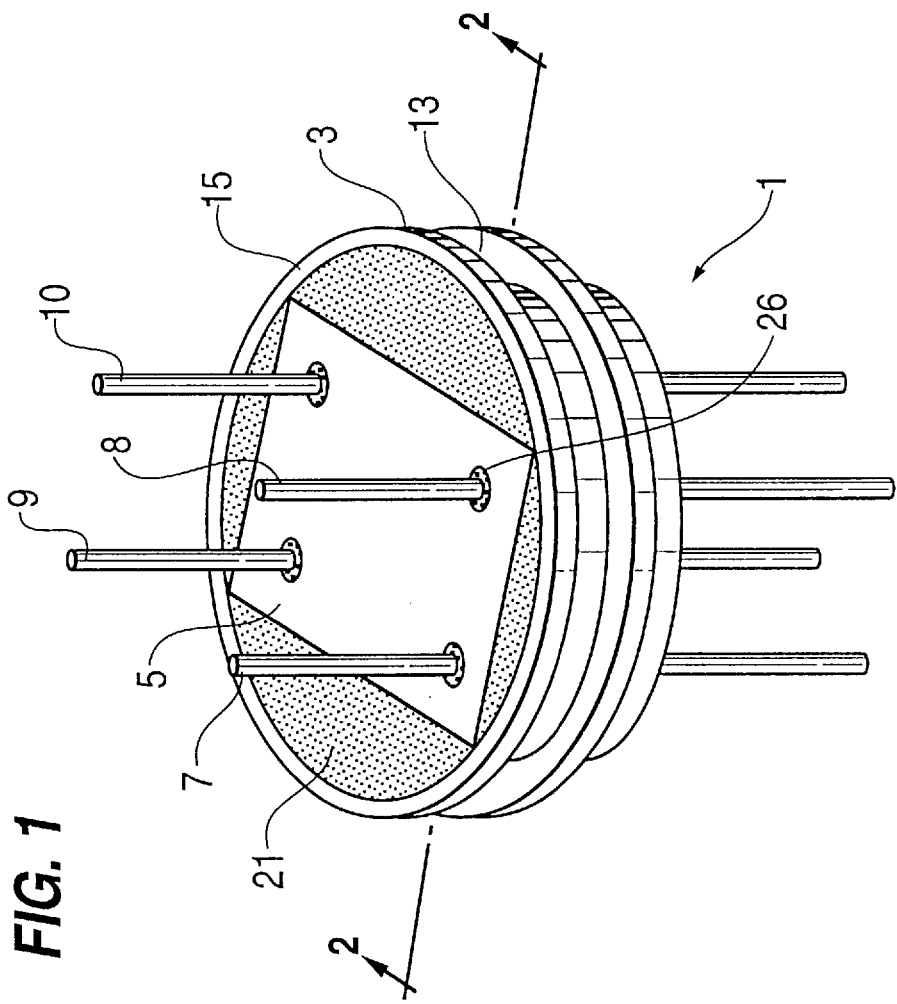
FIG. 1 perspective view of a feed-through filter capacitor assembly in accordance with the present invention.
Figure 2:
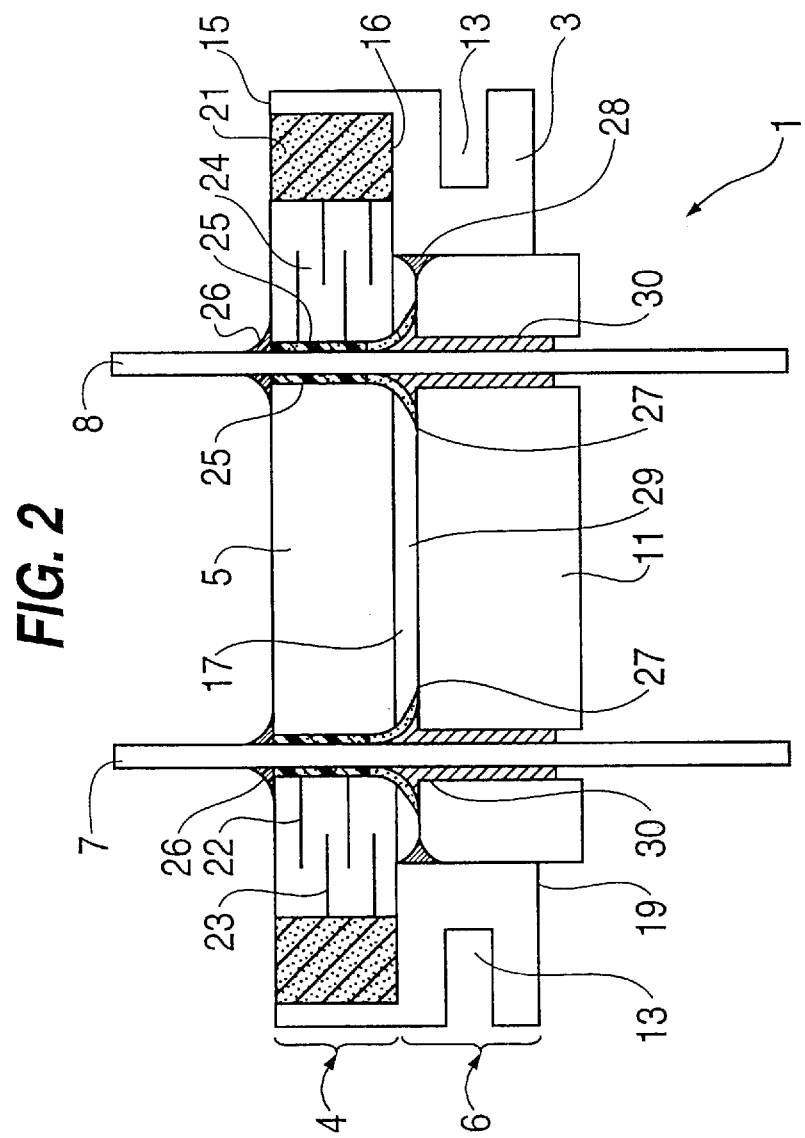
FIG. 2 is a cross-sectional view taken on line 2—2 of FIG. 1.
Figure 3:
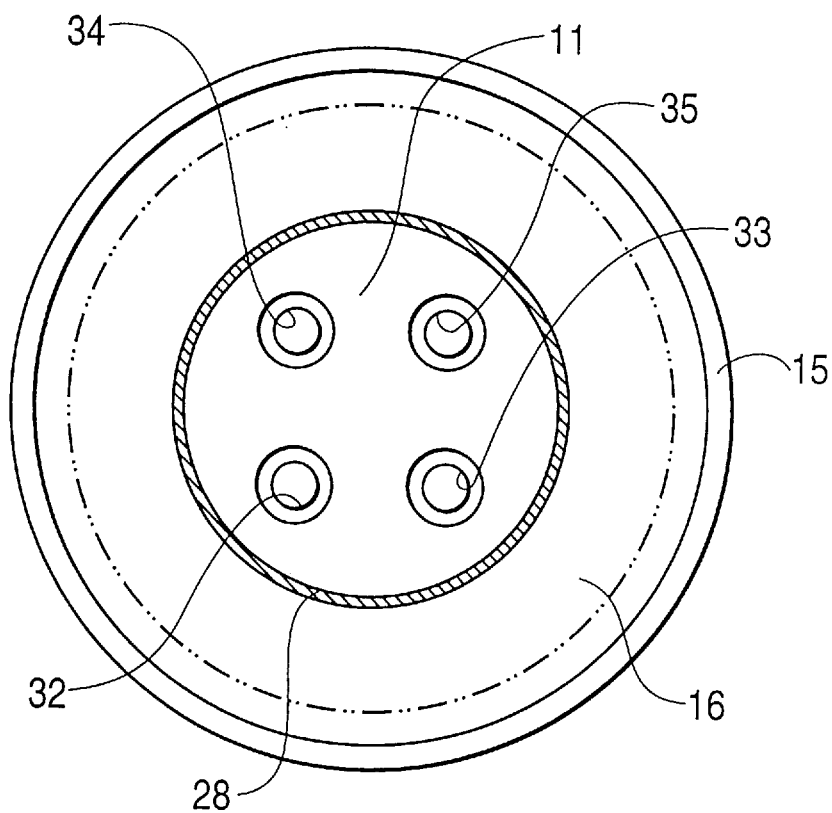
FIG. 3 is a top plan view of the feed-through filter capacitor assembly of FIG. 1, before placement of the capacitor body and wires.

Referring to FIGS. 1–3, illustrated is a feed-through filter capacitor assembly 1 in accordance with the present invention, and a sub assembly thereof (FIG. 3). Feed-through filter capacitor assembly 1 comprises a conductive bushing 3, a filter capacitor body 5, four conductive wires 7–10, and an electrically insulative spacer 11. Preferably, for body implant applications, the completed assembly shall demonstrate a standard leak rate less than $1 \times 10^{-9}$ atm cc/sec (helium) when tested per MIL-S-883 1014, test condition A4. While the illustrated embodiment provides a feed-through for four wires 7–10, it will be understood that the number and type of conductors can be altered to suit the particular application.

As best shown in FIG. 2, bushing 3 has a cup defining portion 4 and an adjacent pass-through portion 6. Importantly, this arrangement allows the diameter of the cup to be varied while keeping the dimensions of the pass-through portion 6 unchanged. This allows the size of the cup to be increased to accept a larger capacitor body 5, without a corresponding increase in the size of a housing opening into which assembly 1 will be mounted.

The outer surface of bushing 3 includes a circumferential groove 13 for receiving adjacent hole forming edges of a two part conductive housing. Obviously, other configurations for attachment of the assembly to a housing could be utilized. As one alternative, pass-through portion 6 may comprises an uninterrupted cylindrical outer surface reduced in diameter relative to cup defining portion 4. Such an arrangement would allow the assembly to be mounted in a feed-through hole formed in a single piece housing by axial insertion, with the bottom of cup defining portion 4 resting directly on the housing.

The cup of conductive bushing 3 is formed by a perimetric wall 15 surrounding a first end surface 16 (see FIG. 2). The cup provides a secure recessed mounting location for filter capacitor body 5.

A central passageway 17 extends through bushing 3 from the bottom of the cup to a second opposite end surface 19 of bushing 3. End surface 16 forms an annular shelf defined between wall 15 and passageway 17. The shelf supports capacitor body 5 extending over passageway 17. In the preferred embodiment, the height of perimetric wall 15 is equal to the thickness of filter capacitor body 5, so that capacitor body 5 sits substantially flush with the top of perimetric wall 15 in the finished assembly.

Conductive bushing 3 can be readily manufactured by known techniques, e.g., either casting or machining from a block. For body implant applications, bushing 3 should be made of a bio-compatible and electrically conductive material, such as titanium (ASTM F67). Wires 7–10 are preferably platinum or platinum/iridium alloy (10% Iridium max.).

After filter capacitor body 5 is centrally positioned within the cup of bushing 3, the remaining space in the cup is filled with a conductive polymer resin 21 to substantially encapsulate the sides of capacitor body 5. In addition to providing electrical continuity, as will be described, polymer resin 21 protects capacitor body 5 from physical damage, and acts as a heat sink serving to absorb heat generated in capacitor body 5. In the preferred embodiment, polymer resin 21 is a conductive epoxy or polyimide.

The shapes of the cup and capacitor body 5 can be altered. However, it is preferred that capacitor body 5 be rectangular and the cup circular. This arrangement provides relatively large spaces between the sidewalls of capacitor body 5 and perimetric wall 15 at all but the corners of capacitor body 5. This simplifies placement of capacitor body 5 within the cup, and filling of the remaining space with resin 21. Moreover, the increased resin mass along the sides results in better heat sink effects and reduced thermal stress problems.

Filter capacitor body 5 is preferably a ceramic chip capacitor having a generally known arrangement of inner and outer sets of spaced capacitor plates 22, 23. Inner capacitor plates 22 are interleaved with respect to outer capacitor plates 23. All of the plates are embedded within a dielectric ceramic material 24. Outer capacitor plates 23 are placed in electrical contact with conductive bushing 3. In the preferred embodiment, the electrical contact is established by conductive polymer resin 21 substantially encapsulating the sidewalls of capacitor body 5. Inner capacitor plates 22 are provided in electrical contact with wires 7–10 by solder, or conductive polymer resin 25 also serving to seal the corresponding passageways. A further seal is provided by non-conductive epoxy 26, 27, preferably applied to wires 7–10 at the top and bottom of filter capacitor body 5.

An electrically insulative spacer 11 fits tightly in passageway 17 of conductive bushing 3. The spacer serves to insulate wires 7–10 from conductive bushing 3, while sealing passageway 17 against fluid passage therethrough. Spacer 11 and bushing 3 are secured (and sealed) together by a bead of gold braze 28 extending about an upper edge. In the preferred embodiment, insulative spacer 11 is made of alumina (A1293, 94% purity or better). Wires 7–10 are preferably secured (sealed) within corresponding passages 32, 33, 34 and 35 provided in spacer 11 by gold braze 30. The insulation resistance between wires 7–10, and between wires 7–10 and conductive bushing 11, is, at 1000 V DC, preferably not less than $10^{12}$ ohm.

It is desirable to provide a space 29 between capacitor body 5 and spacer 11. This will accommodate the beads of braze 28, and adhesive 27 and braze 30 securing the wires within their respective passageways. Moreover, by eliminating contact between capacitor body 5 and spacer 11, external forces imparted to capacitor body 5 will be absorbed by bushing 3 and not transmitted to spacer 11. This makes the assembly less susceptible to damage, e.g., loss of seal integrity, due to impacts.

The present invention has been described in terms of preferred embodiments thereof. Other embodiments, features, and variations within the scope and spirit of the appended claims will occur to person skill in the art from a review of this disclosure.

We claim:

1. A feed-through filter capacitor assembly comprising:

a conductive bushing, said bushing having a first end surface and a perimetric wall surrounding said first end surface to define a cup, said bushing further having a pass-through portion adjacent said cup, said pass-through portion having an internal surface defining a passageway extending from said first end surface, within said cup, to a second end surface opposite said first end surface, said bushing being mountable to seal a feed-through hole of a conductive housing member such that said pass-through portion extends through said hole and said cup remains to one side thereof;

a filter capacitor body mounted within said cup on said first end surface to extend over said passageway, said capacitor having first and second sets of spaced capacitor plates, one of said sets of plates being provided in electrical contact with said conductive bushing;

at least one conductor extending through said filter capacitor body and passageway and being provided in electrical contact with said second set of capacitor plates; and an electrically insulative spacer mounted in said passageway and serving to insulate the at least one conductor from said conductive bushing;

wherein said filter capacitor body is secured within said cup, and its sides are substantially encapsulated, by a polymer resin; and wherein said cup is circular in shape and said capacitor body comprises four sidewalls, and said polymer resin substantially fills the space within the cup between the capacitor body and the perimetric wall.

2. A feed-through filter capacitor assembly according to claim 1, wherein said filter capacitor body is wholly contained within said cup.

3. A feed-through filter capacitor assembly according to claim 3, wherein said polymer resin comprises a conductive polymer resin providing electrical continuity between said first set of capacitor plate s and said bushing.

4. A feed-through filter capacitor assembly according to claim 1, wherein said at least one conductor comprises a plurality of wires.

5. A feed-through filter capacitor assembly according to claim 1, wherein each set of capacitor plates comprises a plurality of plates interleaved with respect to the plates of the other set.

6. A feed-through filter capacitor assembly according to claim 1, wherein said insulative spacer is spaced from said capacitor body.

7. A feed-through filter capacitor assembly according to claim 1, wherein said outer surface of the pass-through portion is cylindrical in shape and forms a circumferential groove for receiving a feed-through hole defining edge of said conductive housing member.

8. A feed-through filter capacitor assembly according to claim 1, wherein said capacitor body is rectangular.

* * * * *

UNITED STATES PATENT AND TRADEMARK OFFICE
CERTIFICATE OF CORRECTION

PATENT NO. : 5,825,608
DATED : October 20, 1998
INVENTOR(S) : Frank A. Duva; Mansoor Azodi-Kazerooni It is certified that error appears in the above-identified patent and that said Letters Patent is hereby corrected as shown below:

Column 2, line 48, after "FIG. 1" insert -- is a --.
Column 5, line 8, change "claim 3" to -- claim 1--.
Column 5, line 12, change "plate s" to -- plates --.

Signed and Sealed this

Twenty-sixth Day of October, 1999

Q. TODD DICKINSON

Attest:

Attesting Officer

Acting Commissioner of Patents and Trademarks